Patented Feb. 18, 1936

2,031,260

UNITED STATES PATENT OFFICE 2,031,260

INFUSIBLE SYNTHETIC RESINS AND PROCESS OF MAKING SAME

Alphonse Gams, Gustave Widmer, and Karl Frey, Basel, Switzerland, assignors, by mesne assignments, to the firm of Ciba Products Corporation, Dover, Del.

No Drawing. Application October 8, 1929, Serial No. 398,268. In Switzerland October 23, 1928

27 Claims. (Cl. 92—21)

This invention relates to synthetic resins from primary aromatic amines and aldehydes having fillers incorporated therewith. It comprises the process for the manufacture of these resins, the new products themselves, as well as the application of same in the synthetic resin industry.

In the copending specifications Serial No. 245,039 and No. 398,267 there are described processes of manufacturing molded infusible synthetic resins which consists in subjecting an infusible but thermoplastic or a fusible condensation product obtained by condensing a primary aromatic amine with a formaldehyde compound in presence of an acid and subsequently eliminating the acid, to molding, if necessary in presence of an aldehydic hardening agent.

According to the above cited specifications the condensation product may be mixed, before molding, with filling agents, coloring matters, softening agents, etc.

It was now found that the production of the highest quality molded products containing fillers is only incompletely achieved when the condensation product serving as binding agent is mixed in pulverulent form with the filling agent, since in this case the binding agent surrounds the filling material well but does not completely impregnate it.

According to the present invention, molded products containing fillers are obtained in which the filling agent is impregnated quite homogeneously with the condensation product serving as the binding agent, if the filling material is added before the elimination of the acid by means of the substance used for binding the acid, that is to say to the solution of the condensation product. The filling agent may be added to the separate condensation components, or to the mixture thereof, in any stage of the condensation process, whereupon, if necessary, the condensation is carried to an end, it may be, with use of at most one molecular proportion of aldehyde, up to the fusible condensation stage, or, with use of a larger proportion of aldehyde, up to the infusible condensation stage.

By this procedure the filling material is completely impregnated by the condensation solution. The acid is now eliminated by means of the acid binding agent, so that the condensation product is precipitated, not only on the surface of but also within the filling material.

The intimate mixture of binding agent and filling material thus obtained is subjected to the molding operation under pressure preferably at a raised temperature, advantageously after washing, and drying, and if desired after comminuting, and also, if necessary, with addition of an aldehyde, or an agent yielding aldehyde.

Instead of pulverulent or fibrous filling materials, textile fabrics or paper or the like may be impregnated in the manner described with the condensation solution; after molding very strong homogeneous molded pieces may be obtained.

By the term "fibrous materials" as used in this application, the applicants mean any one or more of such substances as wood meal, saw dust, canvas, paper, paper pulp, or asbestine.

The examples appended below illustrate the manner of carrying out the invention in connection with any such fibrous material.

The synthetic resinous products containing filling agents when made in the manner described herein show, in comparison with products obtained from a pulverulent mixture made in a dry way, a considerably greater homogeneity and are characterized by a high stability to water as well as high mechanical and electrical resistance. They may, just as the products resulting from the processes of specification Serial No. 245,039, filed January 6, 1928, and Serial No. 398,267, filed October 8, 1929, be applied for the most varied branches of the synthetic resin industry, such as for instance as insulating materials, for the manufacture of artificial objects of any kind, as materials for the construction of machine parts, especially such as have to withstand a high mechanical stress, such as gear wheels, parts of textile machines, such as bobbins, pickers, etc., further as jointing materials, as wood substitutes in the furniture or building industry, etc., also they are very well adapted to be used for gramophone records, horns for loud speakers, and other appliances for acoustic purposes etc.

The following examples illustrate the invention, the parts being by weight:—

*Example 1*

93 parts of aniline (1 mol.) are dissolved with 100 parts of hydrochloric acid of 36 per cent. strength (1 mol.) in 200 parts of water. There are then added, at 25° C., 82.5 parts of a formaldehyde solution of 40 per cent. strength (1.1 mol.) and the temperature is kept at 40° C. After one hour the deep red solution has become somewhat more viscous.

100 parts of wood meal are added and by thorough stirring are completely wetted and impregnated. By addition of a solution of 40 parts of sodium hydroxide in 100 parts of water, the condensation product is precipitated in fine subdivision in and upon the fibre. The mass is filtered, washed free from electrolytes and dried. The comminuted product is pressed at 150° C. to form solid moulded pieces.

Example 2

Canvas, preferably previously degreased, is impregnated with the condensation solution described in Example 1. The impregnated material is then laid in dilute caustic soda solution until its color has become pure. It is then washed, freed from electrolyte and dried. Pieces of this impregnated canvas, with or without intermediate layers of filler-free amine-aldehyde-resin, are pressed at about 150° C., whereby beautiful laminated plates are obtained.

Example 3

Pieces of thin cellulose paper are saturated with the condensation solution obtainable as described in Example 1 and subsequently treated as described in Example 2. There are thus obtained homogeneous moulded laminated products of great strength.

Example 4

100 parts of paper pulp (dry basis) are thoroughly impregnated with a condensation solution obtained as described in Example 1 and then neutralized with alkali. The pulp plus precipitate thus formed can either be worked up after washing and drying to a pressing powder, or it can be used for making paper which, when placed in layers, can be directly pressed to form homogeneous molded pieces, plates, pipes, etc., since it contains the necessary binding agent. The paper can be made according to the usual methods involving beating the pulp, and thereafter forming the sheet on a paper making machine.

Example 5

93 parts of aniline are dissolved by means of 100 parts of 36 per cent. hydrochloric acid in 400 parts of water. 25 parts of asbestine are suspended in the solution and 82.5 parts of a solution of formaldehyde of 40 per cent. strength are added. After a thorough stirring for 1 hour, the condensation product is precipitated by means of a solution of 40 parts of sodium hydroxide in 200 parts of water and the magma thus produced is filtered and the solid matter washed and dried. The yellowish powder thus obtained, when molded at 150° C., yields products which are homogeneous and of bright brown color. They can be worked easily.

Example 6

93 parts of aniline (1 mol.), 100 parts of hydrochloric acid of 38 per cent. strength (1 mol.) and 75 parts of formaldehyde of 40 per cent. strength (1 mol.), are together dissolved in 200 parts of water. Into the solution, which, after a few minutes, becomes a deep red, there are introduced 100 parts of wood meal which are suspended in the solution by strongly stirring. After an hour, the condensation product which has been formed is precipitated by means of a solution of 40 parts of sodium hydroxide in 100 parts of water and the whole is filtered. The solid matter is washed free from electrolyte, dried and comminuted.

The yellowish powder thus obtained is mixed with a few per cents. of paraformaldehyde and molded at a raised temperature to produce solid homogeneous pieces.

Example 7

A product containing a filler which product has low fluidity may be obtained by condensation of 93 parts of aniline with 100 parts of concentrated hydrochloric acid and 112 parts of a solution of formaldehyde of 37.5 per cent. strength, with addition of 140 parts of wood meal. Precipitation by means of caustic soda solution follows. 70 parts of this resin are mixed with 30 parts of a fusible resin obtained by condensing 1 mol. of aniline with 1 mol. of formaldehyde in presence of 1 mol. of HCl and afterwards eliminating the action of the acid (cf. specification Serial No. 398,267, Example 1).

The mixture, when pressed at 150° C. has a very good fluidity and yields very homogeneous pressed pieces.

What we claim is:—

1. The process of manufacturing molded infusible synthetic resinous materials which comprises bringing fibrous material in contact with a mineral acid solution of a resin of a primary aromatic amine and formaldehyde, adding an agent which substantially eliminates the mineral acid present, separating the water from the impregnated fibrous material, and thereafter subjecting the impregnated fibrous material to molding.

2. The process of manufacturing molded infusible synthetic resinous materials which comprises bringing fibrous material in contact with a mineral acid solution of a resin of aniline and formaldehyde, adding an agent which substantially eliminates the mineral acid present, separating the water from the impregnated fibrous material, and thereafter subjecting the impregnated fibrous material to molding.

3. The process of manufacturing molded infusible synthetic resinous materials which comprises bringing fibrous material in contact with a mineral acid solution of a resin obtained by reacting a primary aromatic amine with a substantially equimolecular proportion of a formaldehyde, adding an agent which substantially eliminates the mineral acid present, separating the water from the impregnated fibrous material, and thereafter subjecting the impregnated fibrous material to molding in presence of an aldehydic compound.

4. The process of manufacturing, molded infusible synthetic resious materials which comprises bringing fibrous material in contact with a mineral acid solution of a resin obtained by reacting aniline with a substantially equimolecular proportion of formaldehyde, adding an agent which substantially eliminates the mineral acid present, separating the water from the impregnated fibrous material, and thereafter subjecting the impregnated fibrous material to molding in presence of an aldehydic compound.

5. The process of manufacturing, molded infusible synthetic resious materials which comprises bringing fibrous material in contact with a mineral acid solution of a resin obtained by reacting one mol of a primary aromatic amine with more than one mol of formaldehyde, adding an agent which substantially eliminates the mineral acid present, separating the water from the impregnated fibrous material, and thereafter subjecting the impregnated fibrous material to molding.

6. The process of manufacturing, molded infusible synthetic resinous materials which comprises bringing fibrous material in contact with a mineral acid solution of a resin obtained by reacting one mol of aniline with more than one mol of formaldehyde, adding an agent which substantially eliminates the mineral acid present, separating the water from the impregnated fibrous material, and thereafter subjecting the impregnated fibrous material to molding.

7. As a new article of manufacture, a molded product composed of fibrous material impregnated with an infusible but thermoplastic condensation product of a primary aromatic amine and formaldehyde.

8. As a new article of manufacture, a molded product composed of fibrous material impregnated with an infusible but thermoplastic condensation product of aniline and formaldehyde.

9. As a new article of manufacture, a molded material made from pulp impregnated with an infusible but thermoplastic condensation product of a primary aromatic amine with formaldehyde.

10. As a new article of manufacture, a molded material made from pulp impregnated with an infusible but thermoplastic condensation product of aniline and formaldehyde.

11. As a new article of manufacture, a molded laminated product composed of superimposed layers of fibrous sheet material impregnated with an infusible but thermoplastic condensation product of a primary aromatic amine and formaldehyde.

12. As a new article of manufacture, a molded laminated product composed of superimposed layers of fibrous sheet material impregnated with an infusible but thermoplastic condensation product of aniline and formaldehyde.

13. A moldable sheet material comprising a fibrous substance which has incorporated with the fibres thereof the infusible condensation product of aniline and formaldehyde.

14. A moldable sheet material composed of fibres having incorporated therewith an infusible condensation product of a primary aromatic amine and formaldehyde.

15. A paper-like moldable sheet material composed of fibres having incorporated therewith a moldable condensation product of a primary aromatic amine and formaldehyde.

16. A laminated sheet material composed of superposed sheets of fibres having incorporated therewith a condensation product of a primary aromatic amine and formaldehyde.

17. A laminated sheet material composed of superposed sheets of fibres having incorporated therewith a condensation product of aniline and formaldehyde.

18. The method of producing a moldable sheet material with which an infusible but thermoplastic reaction product of a primary aromatic amine and a formaldehyde compound is incorporated, which comprises reacting a primary aromatic amine with formaldehyde in aqueous acid solution to form a condensation product in solution, saturating pulp with this solution, precipitating with alkali from the solution the condensation product on and around the fibres of the pulp, and thereafter forming paper therefrom.

19. The method of producing a moldable sheet material with which an infusible but thermoplastic reaction product of aniline and formaldehyde is incorporated, which comprises reacting aniline with formaldehyde in aqueous acid solution to form a condensation product in solution, saturating pulp with this solution, precipitating with alkali from the solution the condensation product on and around the fibres of the pulp, and thereafter forming paper therefrom.

20. The method of producing a molded sheet material with which an infusible but thermoplastic reaction product of a primary aromatic amine and a formaldehyde compound is incorporated, which comprises reacting a primary aromatic amine with formaldehyde in aqueous acid solution until a condensation product forms, saturating pulp with said condensation product, precipitating said condensation product from the solution with alkali on and around the fibres of the pulp, making a paper sheet therefrom, and heating and compressing the sheeted stock.

21. The method of producing a molded, sheet material with which an infusible but thermoplastic reaction product of aniline and formaldehyde is incorporated, which consists in reacting aniline and formaldehyde in aqueous acid solution to form a resinous condensation product in solution, saturating pulp with this solution, precipitating the product from solution with alkali on and around the fibres of the pulp, making a paper sheet therefrom, and heating and compressing the sheeted stock at a temperature of about 150° C.

22. The method of producing a molded, laminated sheet material with which an infusible but thermoplastic reaction product of a primary aromatic amine and a formaldehyde compound is incorporated, which comprises reacting a primary aromatic amine with formaldehyde in aqueous acid solution to form a condensation product in solution, saturating pulp with this solution, precipitating the condensation product from solution with alkali on and around the fibres of the pulp, making a paper sheet therefrom, superposing a plurality of layers of said sheeted stock, and heating and compressing the same.

23. The method of producing a molded, laminated sheet material with which an infusible but thermoplastic reaction product of aniline and formaldehyde is incorporated, which consists in reacting aniline and formaldehyde in aqueous acid solution to form a condensation product in solution, saturating pulp with this solution, precipitating the product from solution with alkali on and around the pulp, making a paper sheet therefrom, superposing a plurality of layers of said sheeted stock, and heating and compressing the same.

24. A method of producing moldable sheet material with which an infusible but thermoplastic reaction product of a primary aromatic amine and formaldehyde is incorporated, which comprises forming an acid solution by reacting one mol of a primary aromatic amine with more than one mol of a formaldehyde compound in presence of at least approximately one mol of a mineral acid, saturating pulp with this solution, precipitating with alkali from the solution the condensation product on and around the fibers of the pulp, and thereafter forming paper therefrom.

25. A method of producing moldable sheet material with which an infusible but thermoplastic reaction product of aniline and formaldehyde is incorporated, which comprises forming an acid solution by reacting one mol of aniline with more than one mol of formaldehyde in presence of at least approximately one mol of a mineral acid, saturating pulp with this solution, precipitating with alkali from the solution the condensation product on and around the fibers of the pulp, and thereafter forming paper therefrom.

26. A method of producing moldable sheet material with which an infusible but thermoplastic reaction product of a primary aromatic amine and formaldehyde is incorporated, which compries forming an acid solution by reacting substantially equimolecular proportions of a primary aromatic amine and a formaldehyde compound in presence of a substantial proportion of a mineral acid, saturating pulp with this solution, precipitating with alkali from the solution the condensation product on and around the fibers of the pulp, forming paper therefrom and thereafter heating and compressing the sheeted stock in the presence of an aldehydic compound.

27. A method of producing moldable sheet material with which an infusible but thermoplastic reaction product of aniline and formaldehyde is incorporated, which comprises forming an acid solution by reacting substantially equimolecular proportions of aniline and formaldehyde in presence of a substantial proportion of a mineral acid, saturating pulp with this solution, precipitating with alkali from the solution the condensation product on and around the fibers of the pulp, forming paper therefrom and thereafter heating and compressing the sheeted stock in the presence of an aldehydic compound.

ALPHONSE GAMS.
KARL FREY.
GUSTAVE WIDMER.